Dec. 3, 1946. P. THOMPSON Re 22,815
CARGO SHIP CONSTRUCTION
Original Filed Oct. 23, 1943 6 Sheets-Sheet 1
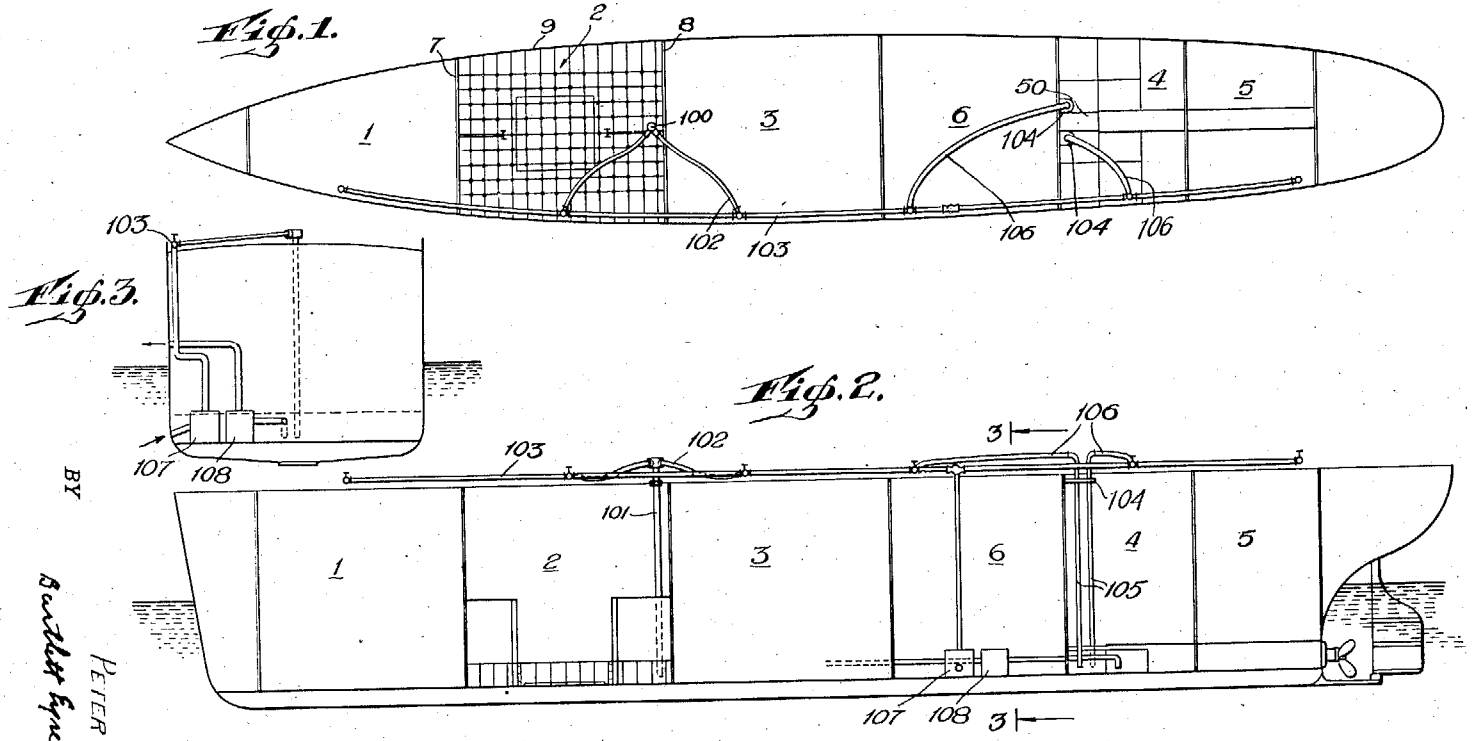
INVENTOR
PETER THOMPSON
BY
Bartlett Eyre Keel & Wagner
ATTORNEYS Dec. 3, 1946. P. THOMPSON Re 22,815

CARGO SHIP CONSTRUCTION

Original Filed Oct. 23, 1943 6 Sheets-Sheet 2

INVENTOR
PETER THOMPSON

BY Bartlett Eyre Keel & Weymouth
ATTORNEYS

Dec. 3, 1946. P. THOMPSON Re 22,815
CARGO SHIP CONSTRUCTION
Original Filed Oct. 23, 1943 6 Sheets-Sheet 3
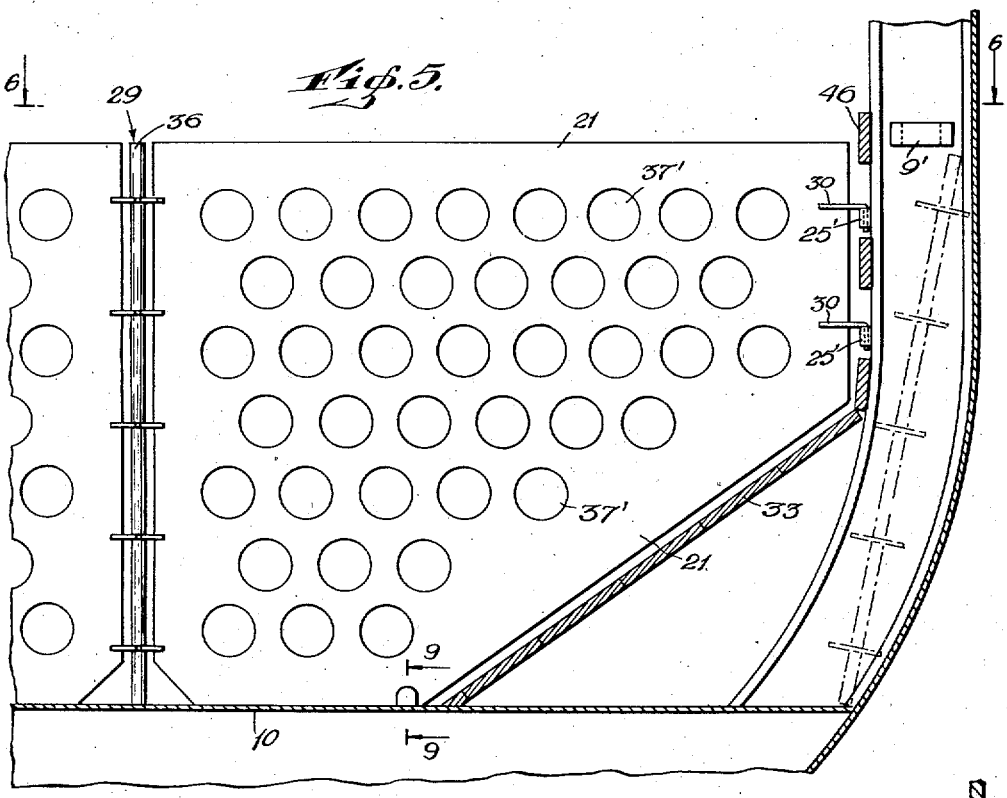
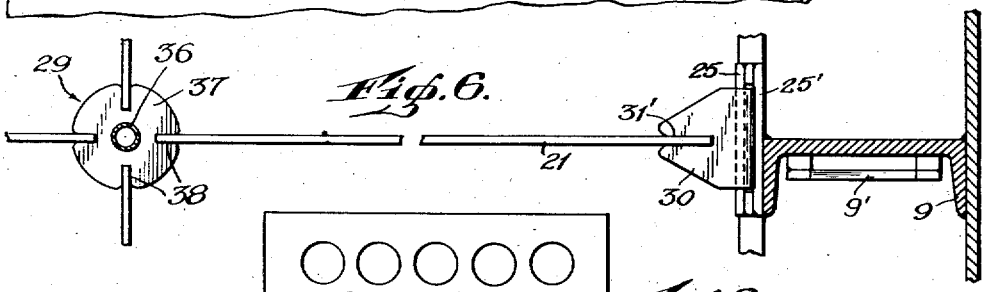
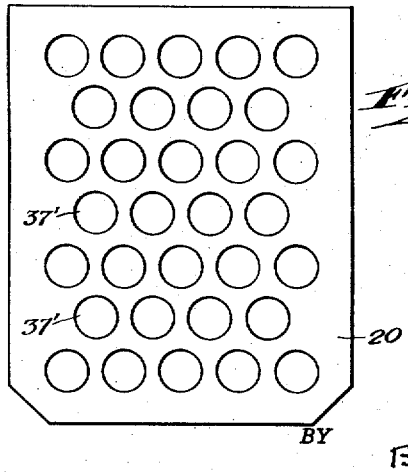
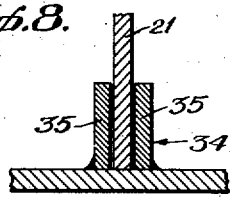
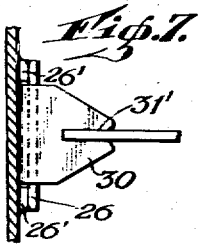
Fig. 9.
INVENTOR
PETER THOMPSON
BY Burlett Espe Keel + Weymouth
ATTORNEYS Dec. 3, 1946. P. THOMPSON Re 22,815

CARGO SHIP CONSTRUCTION

Original Filed Oct. 23, 1943 6 Sheets-Sheet 4

INVENTOR
PETER THOMPSON
BY Bartlett Tyre Kell & Weymouth
ATTORNEYS

Dec. 3, 1946. P. THOMPSON Re 22,815
CARGO SHIP CONSTRUCTION
Original Filed Oct. 23, 1943 6 Sheets-Sheet 5
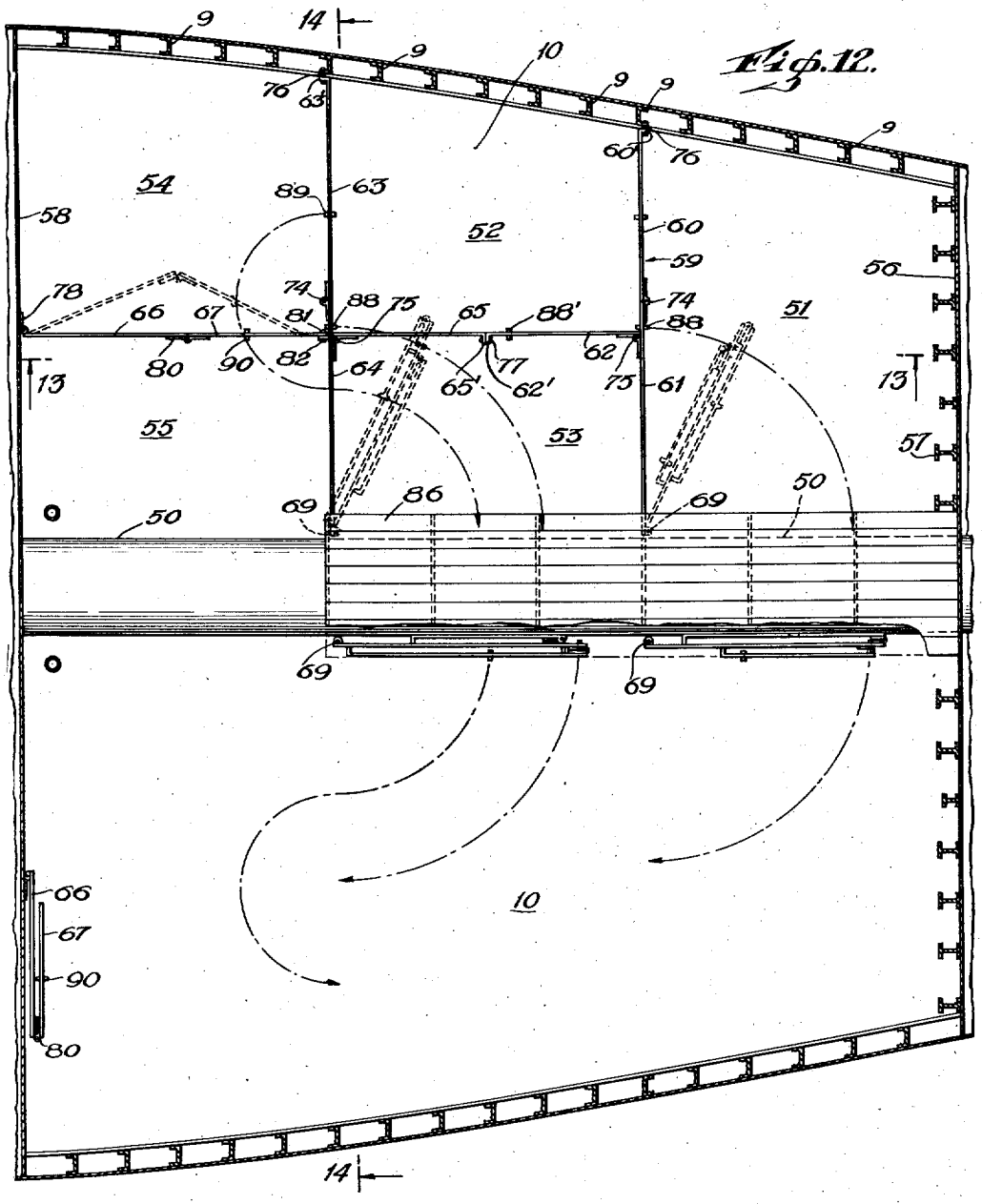
INVENTOR
PETER THOMPSON
BY Bartlett Eyre Keel & Weymouth
ATTORNEYS Dec. 3, 1946. P. THOMPSON Re 22,815

CARGO SHIP CONSTRUCTION

Original Filed Oct. 23, 1943 6 Sheets-Sheet 6

INVENTOR
PETER THOMPSON

BY Bartlett Eyre Keel & Weymouth
ATTORNEYS

Reissued Dec. 3, 1946

Re. 22,815

UNITED STATES PATENT OFFICE 22,815

CARGO SHIP CONSTRUCTION

Peter Thompson, New Orleans, La.

Original No. 2,364,928, dated December 12, 1944, Serial No. 507,377, October 23, 1943. Application for reissue November 26, 1945, Serial No. 630,954

29 Claims. (Cl. 114—125)

This invention relates to ship construction and particularly to a novel and improved cargo hold structure for merchant ships.

Merchant ships are usually designed to carry a maximum load of cargo at the highest possible speed and with the least possible fuel consumption. No difficulty is experienced in the navigation of such ships when loaded, but difficulties are often encountered with most merchant vessels when free of cargo in steering and making the desired headway, particularly in rough weather. This is due to the fact that the combined weight of fuel, water and operating supplies are insufficient to submerge the unloaded vessel to a point where it can be efficiently and safely navigated, even though all tanks may be full to capacity with fuel oil, boiler and/or culinary water. Thus such a ship without cargo may not be submerged to the required minimum draft for efficient and safe navigation and operation during adverse weather conditions. When operated during adverse weather the unloaded condition of the vessel not only renders efficient and safe navigation difficult but it results in heavy pounding and excessive racing of the propeller with a possible consequent damage to the vessel's structure and machinery. When the ship is operated at an extreme light draft the propeller is often insufficiently submerged and therefore subjected to severe racing and this makes it difficult for the vessel to maintain sufficient headway to keep on the desired course. Even the modern newly constructed Liberty vessels are insufficiently submerged with all fuel tanks, etc. full to capacity to insure efficient and safe navigation during adverse weather when the vessels are unloaded.

In order to overcome these difficulties it has heretofore been the practice to carry large quantities of temporary ballast whenever the vessel was obliged to sail without sufficient cargo so as to submerge it to a point where the vessel could be safely navigated. For example, in the North Atlantic during the winter months it has been customary to carry such ballast. Such vessels sometimes carry several thousand tons of solid ballast when bound from Europe to the United States without cargo during the winter months. Different types of solid ballast have been used, such as sand, rock, pig iron, etc. but wholly irrespective of the kind of ballast carried considerable expense is incurred in the purchase, loading and discharge of such ballast. Valuable time is also lost in the loading and unloading of such ballast. For example, as a rule it requires from one to two days at each end of the voyage to load and discharge the ballast. Moreover, often solid ballast is not always available and in some cases the vessel is compelled to proceed coastwise to other ports where solid non-shifting ballast may be obtained before proceeding on the difficult ocean voyage, which of course further adds to the expense and loss of time. Such solid ballast is ordinarily placed in the cargo holds which are adapted to the reception of either cargo or solid ballast.

A ballast of river or sea water is of course available wherever the ship may be but water ballast carried in the vessel's holds is impractical because it would be both difficult and dangerous to carry hundreds of tons, perhaps thousands of tons, in the conventional ship structures, which volume would be necessary in order to submerge the vessel to the required minimum draft. Assuming, for example, 500 tons of ballast water were carried in a hold and rough weather should be encountered which caused the vessel to pitch and roll, this large weight of water in the hold would be thrown against the athwart ship bulkheads with tremendous force when the vessel was pitching and with a similarly large force against the ship's sides when the vessel was rolling. This would put a terrific strain on the bulkheads which are not usually designed to withstand such strain for any appreciable length of time and the ship's sides might also be impaired. Moreover, the rapid shifting of the hundreds of tons of free water from one side of the vessel to the other would exaggerate the pitching and rolling and probably result in the vessel becoming uncontrollable, and its safety impaired due to the terrific strain. Thus with conventional ship structures it is impractical to use the always available water as ballast.

One object of the invention is a novel and improved ship cargo hold structure which is characterized by the availability of the whole cargo space for cargo when paying cargo is available and further by the fact that this same cargo space may be safely utilized when the ship is unloaded for the carrying of water ballast without interference with the safe navigation of the ship and without putting undue strains upon either the usual bulkheads or any other part of the ship structure due to the presence of the water ballast.

A further object of the invention is a ship hold structure which makes it possible for the ship safely to navigate without carrying solid ballast whenever sufficient cargo is not available to submerge the vessel to a minimum safe operating draft, thereby eliminating the expense of purchasing, loading and discharging solid ballast.

A further object of the invention is a ship hold structure which is adapted to contain either cargo or water ballast, thereby eliminating the time consumed to load and discharge solid ballast or in diverting the vessel to another coastwise port where solid ballast may be available and loaded before proceeding on an ocean voyage.

A further object of the invention is a ship structure of the general character indicated above which is capable of carrying either solid cargo or a liquid ballast without interference with the safe navigation of the ship. Further the steaming time between ports is not reduced when liquid ballast is carried in lieu of inconvenient and expensive solid ballast. Irrespective of whether liquid or solid ballast is carried the vessel will, in either case, be submerged to the minimum draft required for safe operation and hence the vessel's speed capability will remain unchanged.

A further object is a novel ship hold structure which is easily and quickly convertible by the usual unskilled ship personnel or stevedores for safely carrying either paying cargo or sea water ballast.

Other objects of the invention will hereinafter appear.

For a better understanding of the invention reference may be had to the accompanying drawings, wherein—

Fig. 2 is a side view thereof;

Fig. 3 is a view showing the fire and bilge pumps;

Fig. 4 is an enlarged plan view of the bottom part of the No. 2 hold structure illustrated in Figs. 1 and 2;

Fig. 5 is a sectional view along the line 5—5 of Fig. 4;

Fig. 6 is a sectional view along the line 6—6 of Fig. 5;

Fig. 7 is a plan of one of the details of the structure;

Fig. 8 is a view of one of the bulkhead or swash plate elements of the structure;

Fig. 9 is a sectional view along the line 9—9 of Fig. 5;

Fig. 12 is an enlarged plan view of the hold 4 of Figs. 1 and 2;

In the embodiment of the invention herein illustrated the holds of the ship or certain of them are provided with a multiplicity of small individual water ballast compartments with the top of the inner bottom tank or the floor of the hold forming the bottom of these compartments and with the sides of the compartments being formed of collapsible and readily dismantlable steel bulkheads or swash plates, with the construction of these individual compartments such that when the walls thereof are collapsed they occupy very little space with no appreciable cargo space being sacrificed. The structure is further characterized by the simplicity with which the various compartment units are fastened to each other and to the side frames and bulkheads of a hold, and by the ease with which the compartments may be set up or dismantled and stored. These collapsible bulkheads or swash plate structures when assembled in position to form a part of the bottom of the hold, enable the vessel to safely carry thousands of tons of sea water as ballast without subjecting the conventional ship bulkheads and side frame structures to undue strain which might cause serious damage and without imperiling the seaworthiness of the ship in storms. Either paying cargo or the water ballast thus occupies the same space on the floor of the hold as the case may be and economy of transport is maintained.

Figure 1:
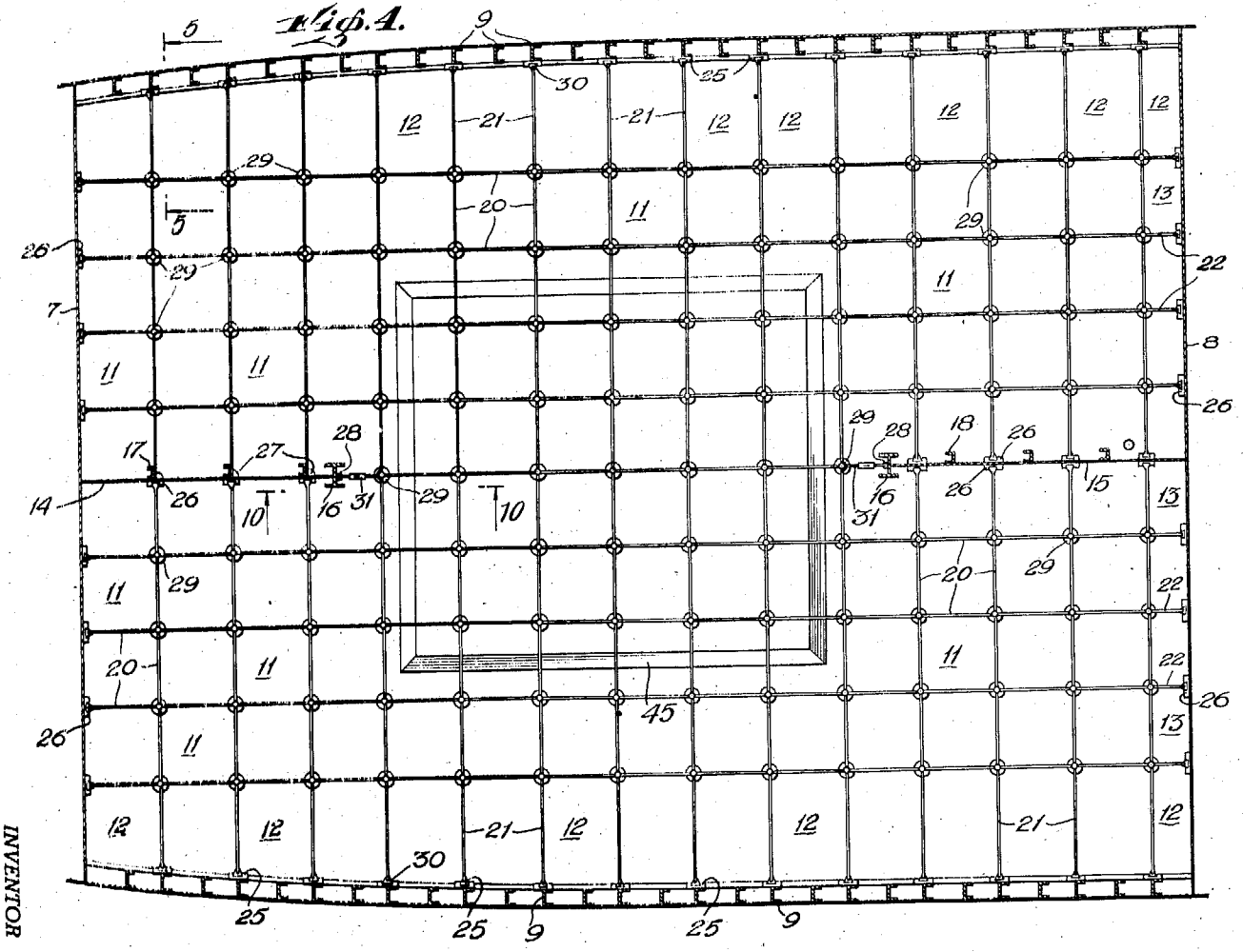
Fig. 1 is a plan view diagrammatically illustrating a ship embodying the invention.
Figure 11:
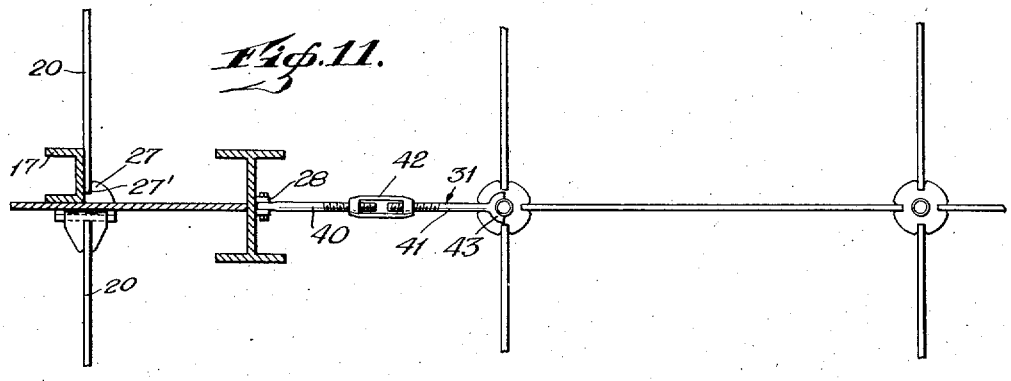
Fig. 11 is a top view of the structure shown in Fig. 10.
Figure 10:
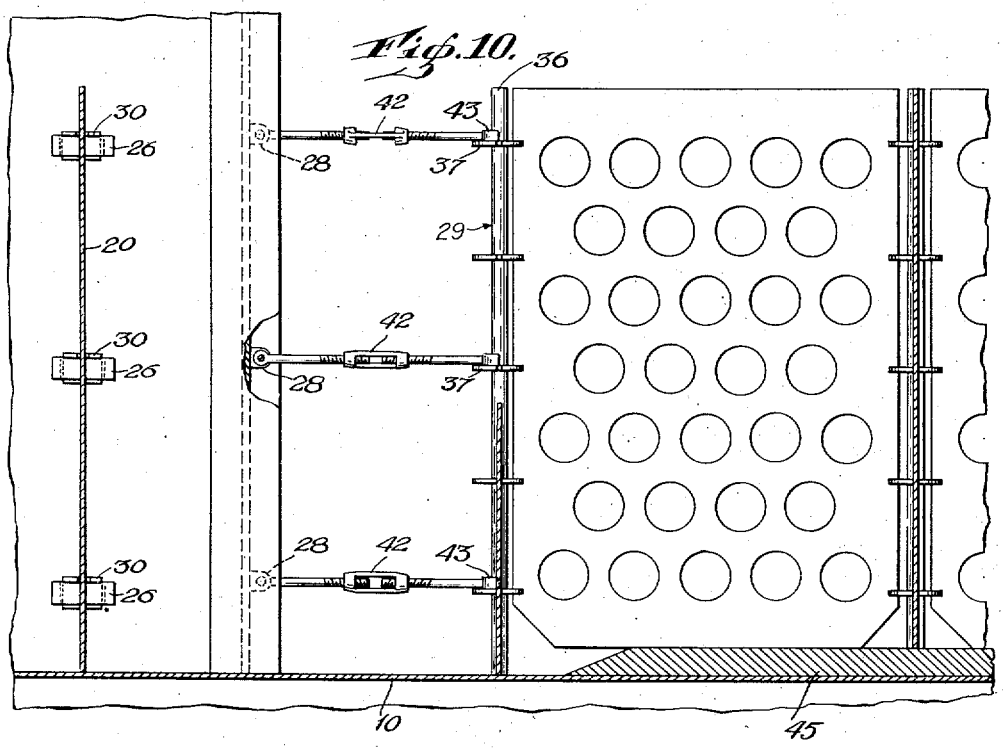
Fig. 10 is a sectional view along the line 10—10 of Fig. 4.
Figure 13:
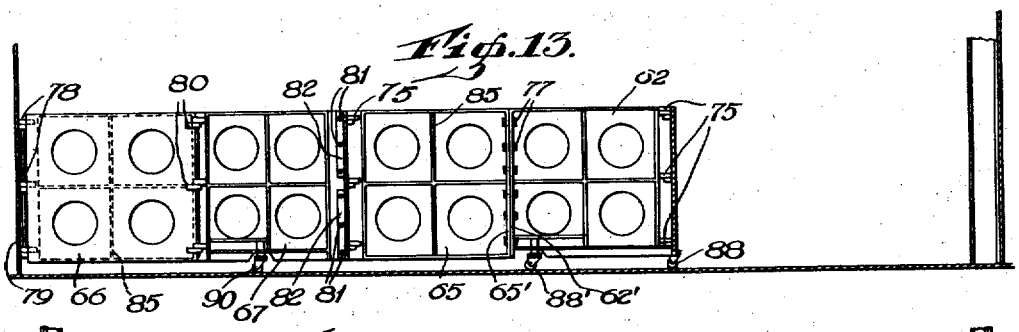
Fig. 13 is a sectional view along the line 13 of Fig. 12.
Figure 14:
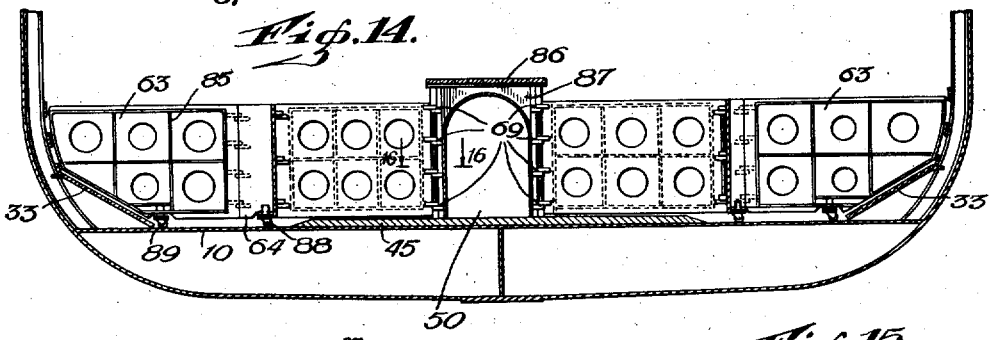
Fig. 14 is a sectional view along the line 14 of Fig. 12.
Figure 16:
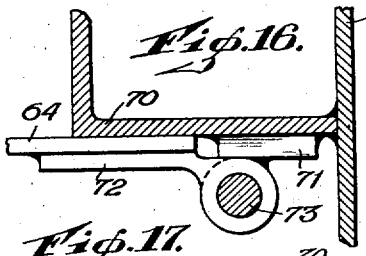
Figs. 15, 16 and 17 are views of details of the structure of Figs. 12, 13 and 14.
Figure 17:
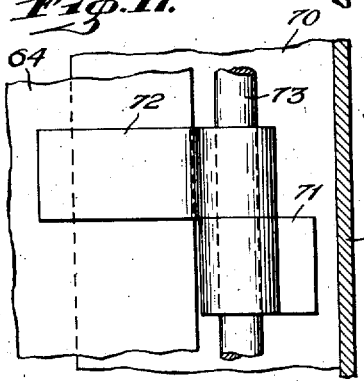

I have illustrated my invention as embodied in a merchant ship having forward hold members 1, 2 and 3, a boiler and engine room 6 and the after holds 4 and 5 which are located aft of the engine room (Figs. 1 and 2). I have illustrated my invention as embodied in the forward hold 2 and the after hold 4. I will describe first the modification of the invention embodied in the No. 2 hold (Figs. 4 to 11).

The No. 2 hold is defined by conventional athwart bulkheads 7 and 8 and by the side frame structure of the ship comprising the channel frame members 9. The bottom of the hold is the conventional floor 10 which forms the top of the inner bottom tank or storage compartment in the bottom of the ship. The bottom part of the hold is provided with a multiplicity of identical individual separate compartments 11, a plurality of individual compartments 12 disposed along the ship's side frame structure, and a plurality of identical individual compartments 13 adjacent the bulkhead 8. The individual compartments 12 vary in dimensions due to the curvature of the sides of the ship and the individual compartments 13 are in this particular illustration smaller than the individual compartments 11 due to the even number of ship's frames involved. The construction is preferably such as to provide the greatest possible number of identical compartments 11 with their interchangeable side walls.

In this illustration the hold is also provided with fore and aft center line bulkheads 14 and 15 which project inwardly from the bulkheads 7 and 8 and centrally of the hold to I-beams 16. The center line bulkhead 14 is provided with bulkhead stiffeners 17 and the center line bulkhead 15 is provided with bulkhead stiffeners 18.

The individual compartments 11, 12 and 13 of the hold are formed by perforated bulkhead or swash plates which are collapsible or portable and may be readily set up and dismantled at will. The construction and mounting are such that when assembled as illustrated they are rigidly and fixedly fastened so as to retain their positions notwithstanding distortion and twisting movements of the ship under the most severe weather conditions though the only fixed fastenings are at the side frames and the bulkheads 7, 8, 14 and 15, and moreover, the whole structure may be disassembled with the greatest facility by the ordinary seaman and storable in a manner to occupy very little cargo space.

The collapsible bulkheads or swash plates for the compartments 11 are all of identical size and shape and are indicated by the numeral 20. The compartments 12 are formed by collapsible bulkheads or plates 20 on the inner sides in the fore and aft direction and by collapsible bulkheads or swash plates 21 in the athwart ship direction. These plates or bulkheads 21 vary in dimensions depending upon the curvature of the side of the ship. The individual compartments 13 are formed of collapsible bulkheads or swash plates 20 on one side and 22 on the two other sides with the fixed bulkhead 8 forming one side of these compartments.

As above indicated, the structure is such that the only permanently fixed fastenings for the collapsible bulkheads or swash plates 20, 21 and 22, are located at the bulkheads 7, 8, 14 and 15 and at the side frames 9 of the ship hold structure. These fixed fastening means at the side frames are the fittings indicated at 25 and the fixed fastening means at the bulkheads 7 and 8 are the fittings 26. The fixed fittings at the bulkheads 14 and 15 comprise the fittings 26, the fittings 27 and the fittings 28, the latter being fastened permanently to the I-beams 16.

The removable fastening means for the collapsible bulkhead or swash plates include stanchions 29 disposed at the junctures of the plates, removable clips 30 cooperatively functioning with the fixed fittings 25 and 26 and the adjusting members 31 disposed between adjacent stanchions 29 and the I-beams 16. The fixed fittings 26 are metallic sockets welded to the bulkheads for the reception of the removable L-shaped fittings or clips 30 and are fastened, as for example, by welding to the bulkheads. These fittings 26 may be formed in any conventional manner, as for example, by welding the ends of an outside bar to two spaced short blocks 26′ which are welded to the bulkheads or frame. One leg of the L-plate member 30 rests in the socket whose surfaces are formed by the bulkhead and the fitting 26. The member of the fitting L which passes into the socket is thus vertically disposed while the other member is horizontally disposed and projects inwardly of the hold. The latter member is provided with an open slot 31′ disposed at right angles to the bulkhead for the reception of an edge of the plates 20. For each edge of the plate 20 there are provided at least two sockets 26 and L members 30, one near the top of the plate and one near the bottom thereof and preferably there are more than two such cooperating fittings. The fixed fittings 25 on the side frame members are like the fixed fittings 26 located on the bulkheads, in the form of sockets for the reception of the removable L members 30. These fittings 25 are, however, fastened as by welding to the legs of the channel member 9 and in the construction of these fittings an extra bar 25′ is required on the back, projecting beyond the channel leg which is comparatively narrow, so as to form a socket long enough to accommodate the width of the L member 30.

As many of these fittings 25 as may be desired are provided for each plate 21 and there are illustrated in Fig. 5 two of such fittings at that station. The plate 21 has a corner cut off to clear the bilge boards 33 so that the edge of the plate 21 adjacent a channel 9 is comparatively short, requiring only two fittings. There are also additional fixed fittings for the plates 21, these fittings being indicated at 34 and being disposed adjacent the lower edge of the bilge boards 33. These fittings 34 comprise a pair of lugs or plate members 35 which are fastened as by welding to the floor 10 of the hold or top of the inner bottom tank. There is one such fitting 34 for each of the plates 21 and the latter rest in the slot formed between the two lugs or plates 35.

The stanchions 29 (Figs. 5–6) comprise extra heavy pipes 36 having welded thereto throughout their length spaced discs or flanges 37. These discs 37 are perforated in their centers so as to pass over the pipes 36 and are fastened in any suitable manner thereto as by welding. Each disc has four slots 38 formed therein, these slots being disposed 90° apart to accommodate vertical edges of the right angularly disposed plates 20, 21 and 22. It is understood that the discs 37 are fastened to a pipe 36 so that the slots 38 of each disc are aligned with the slots of the discs above and below the same. In the particular embodiment shown in Fig. 5 there are five of such discs 37 on each stanchion but any number may be provided. These stanchions rest upon the floor of the hold, namely the top of the inner bottom tank, and are held in position by the four adjacent plates which lock and hold the stanchions in place except two stanchions in the center line which are supported by three adjacent plates and screw jacks. The discs 37 may be conveniently and economically formed from the metal removed by the perforations 37′ formed in the plates 20, 21 and 22. For example, these discs 37 may be of the same dimensions as the perforations 37′ so as to economize on metal.

At the bulkheads 14 and 15 certain of the fixed fittings are identical with the fixed fittings 26 described above. Certain of them however are formed by bulkhead stiffeners 17 and by a clip or holding member 27 of the character shown in Figs. 4 and 11. These fittings 27 are slotted at 27′ to receive an edge of the plate 20 between the member 27 and the stiffener 17.

At the inner ends of the bulkheads, namely at the I-beams or ship stanchions 16, the fixed fittings 28 welded to ship stanchion 16 are clips or padeyes to which are pivotally fastened the turn buckle or screw jack members 31. Each of the latter comprises the conventional relatively movable screw threaded parts 40 and 41 with a cooperating internally right and left threaded screw sleeve 42 engaging the same. The member 41 is provided with a forked end 43 having a recess adapted to fit pipe stanchion 36 and this member 41 rests upon an adjacent disc 37 as illustrated, in Figs. 10 and 11. By this means the seven portable stanchions 29 disposed between and in line with the I-beams 16 may be supported against movement in a direction in line with these beams or in line with the bulkheads 14 and 15. By screwing up on the turn buckles or screw jacks the structure may be made as firm and secure as desired.

A wood ceiling is ordinarily provided upon the top 10 of the inner bottom tank for protection against injury to the floor 10 by cargo being lowered into the hold. In some cases the entire whole floor or inner bottom tank top 10 is covered by such protective wood ceiling, while in other cases, as shown at 45, only the central part directly under the hatch opening and which is most exposed to injury while loading is protected with such ceiling.

The assembly and disassembly of the structure above described is easily effected by the seamen or ship personnel, the weight of no liftable or portable element being too large for two men to handle. The disassembly may be initiated at any point by merely lifting one of the stanchions 29 out of position, or removable L members 30 may be removed to disengage the plates from the bulkheads or the side frame of the ship. The individual plates may be stored away flat upon each other upon the floor 10 at any convenient place and will not occupy any appreciable cargo space. The stanchions 29, as shown in Fig. 5, may be stored between the channel beams 9 forming the side frame of the ship and behind the bilge boards 33 and the cargo battens 46. The clips or L members 30 will readily fit on the sides of the channel beams 9 and may be stored thereon. In the particular embodiment shown I have fastened socket members 9' to these channels 9 for the reception of and holding these disassembled clips in pairs. The whole cargo space therefore is utilized for carrying useful and paying load when there is cargo to be carried, except for very limited and insignificant space occupied by plates 20, 21 and 22 stored horizontally on top of each other on floor 10. When there is no cargo to be carried the collapsible bulkhead or swash plates 20, 21 and 22 may be easily assembled into position by the ship crew or stevedores fitting the plates into the slots of fittings 27, 30 and 34 and this may be effected by starting the assembly at any desired point. In cases where it is not practical to slide the plates into the discs on the stanchions, the four plates are merely placed in position at right angles, and the stanchion is dropped from above to interlock all four plates. The turn buckles 31 are tightened so as to support the stanchions 29 nearest to the I-beams 16 against collapse. Thus with no fixed fastenings except the sides of the hold, the bulkhead or swash plates 20, 21 and 22 and the stanchions 29 are firmly and rigidly held against collapse.

A modification of the invention for the No. 4 hold, aft of the boiler and engine room 6, is illustrated in Figs. 12–17. The bottom of this hold is penetrated by the conventional shaft alley or tunnel 50 which is centrally disposed and divides the bottom of the hold into two separate parts. The casing for this hold acts as a center line bulkhead at the bottom of the hold.

On each side of the tunnel 50 the bottom of the hold is divided into five individual compartments 51, 52, 53, 54 and 55. The compartment 51 is formed on one side by the casing of the tunnel 50, on its aft side by the bulkhead 56 having vertical stiffeners 57 and on its outer side by the ship side frames (channel frame members 9). The fore side of compartment 51 is formed of a collapsible or removable wall 59. The side frame of the ship forms the outer walls of compartments 52 and 54 and the tunneled casing forms the inner wall of compartments 53 and 55. The bulkhead 58 forms the fore walls of compartments 54 and 55. The collapsible or movable walls of the compartments 52, 53, 54 and 55 comprise the walls 59 and 62, 63, 64 and 65, and 66 and 67. The collapsible wall 59 comprises the bulkhead or swash plates 60 and 61.

The bulkhead or swash plates 61 and 64 are attached to the side of the shaft alley casing 50 by hinges 69 permitting the swinging thereof either to a position at right angles to the casing 50 to form the compartments or to a position parallel with the casing when water ballast is not to be employed. They are hinged for swinging movements about vertical axes and are, as illustrated in the embodiment hereof, of approximately the same height as the tunnel casing. The hinge structures for the plates 61 and 64 are identical so that a description of one will suffice. Each plate is mounted for swinging movements on four individual sets of hinges which are attached to a vertical angle iron 70 welded or otherwise fastened to the side of the tunnel casing 50. Each of these hinges 69 comprises a fixed hinge element 71 which is welded to the stiffener 70 and a movable hinge element 72 which is welded to the bulkhead or swash plate and in the particular embodiment shown a single hinge pin or rod 73 functions as a hinge pin for all of the four hinges. It is observed that the axis of the hinge, namely the hinge pin 73, is spaced from the side wall 50 of the tunnel casing so as to facilitate the positioning of the collapsible bulkheads up against or in the vicinity of the tunnel wall 50. Figs. 12 to 17 show in the full lines the position occupied by the plates 61 and 64 when in position to function as bulkheads or swash plates for the water ballast.

Each of these plates 61 and 64 has hinged thereto a pair of bulkhead or swash plates forming other sections of the structure. The plate 61, for example, has hinged thereto by means of the hinge 74 the swash plate 60 which forms a continuation of the plate 61 when in position to function for water ballast, and a swash plate 62 is hinged to one side thereof by a hinge 75, this plate 62 when used for water ballast being at right angles to the plates 60 and 61. There are at least two hinges 74 and at least two hinges 75 and preferably more, as for example, four of hinges 74 and three of hinges 75, so as to form a firm support and hinge relation between the plates 61 and 62 on the one hand, and 61 and 60 on the other hand, throughout their height. The hinges 74 and 75 are disposed on the opposite sides of the plate 61. Likewise, the plates 64 has hinged thereto the plate 63 which forms a continuation of plate 64 in the water ballast functioning position and the plate 65 at right angles thereto which forms the continuation of the plate 62. These plates 63 and 65 are hinged to 64 by means of hinges 74 and 75 similar to the hinges on plate 61. In the position the plates assume for functioning with the water ballast the plates 60 and 63 are fastened to the channel members 9 of the ship frame by means of bolts 76 passing through the flange of the channel member 9 and through ears or flanges 60' and 63' formed on the edge of the plates. There may be as many fastening bolts 76 as desired and at least two and preferably more distributed out through the edge of the plates. The plates 62 and 65 are of a horizontal length equal to one-half the distance between the plates 61 and 64 so that their free ends substantially abut one another and are fastened together by means of bolts 77 at their abutting edges. The plates 62 and 65 are provided with ears or flanges 62' and 65', respectively, through which the bolts pass.

The plate 66 is hinged to the bulkhead 58 at a point intermediate the side frame of the ship and the tunnel 50, the hinges being shown at 78. The stiffeners on the bulkhead 58 are omitted for convenience in illustration. At least two such hinges 78 are provided and preferably a larger number so as firmly to support the plate 66 upon the bulkhead and if desired a bulkhead stiffener may be provided at this point of the bulkhead upon which the plate is swung. In the particular embodiment shown there are three such hinges having a common hinge pin 79. The plate 67 is hinged to the plate 66 at its free edge by means of hinges 80, there being in the particular embodiment shown three of such hinges. These two plates 66 and 67 together bridge the bulkhead 58 and the plate 64 in the fore and aft direction when in position for water ballast functioning. The plate 67 is fastened to the plate 64 by means of bolts 81 passing through the edge of the plate and through ears or a flange 82 formed on the plate 64 on the opposite side from and in the vicinity of the hinge 75.

Preferably the plates are provided with stiffening means arranged crosswise thereof and these stiffeners may take the form of flat iron bars around the edges and also arranged crosswise thereof, such for example as the iron bars 85. The stiffeners on adjacent plates are so arranged as not to interfere with the collapsing function of the plates when they are collapsed against the bulkhead 58 or against the tunnel 50. This may be accomplished by having the stiffeners on the surfaces of plates which are not adjacent when collapsed or by offsetting the stiffeners of one plate with respect to the other so as to fit thereinto when collapsed.

Fig. 12 illustrates how a collapsible and movable bulkhead or swash plate structure may be collapsed and stored against the bulkhead 58 and the tunnel 50. The groups of plates 60, 61 and 62 and 63, 64 and 65 are assembled in units so that the plate 61 in one group and the plate 64 in the other group have lying flat against the opposite sides thereof the other two plates of a group. As thus collapsed, these two groups are swung clockwise (Fig. 12, upper half, see broken line position) against the side of the tunnel 50. The plate 66 upon being swung over counterclockwise (Fig. 12 upper half) against the bulkhead 58, the plate 67 may then be collapsed against the side of the plate 66 so that the two plates lie flat against the bulkhead 58. The bottom of the hold is thereby cleared for paying cargo. The structures of the lower half swing oppositely to those of the upper half upon collapse and storage on the one hand, and assembly for ballast functioning on the other.

Thus when the two groups of plates which are hinged to each side of the tunnel 50 are swung into position to function for water ballast each complete set or group of plates forms the letter T. Two of the plates will be in a straight line with each other extending from the hinge at the tunnel casing to the ship's frame. The third plate which is of smaller dimensions will be at a right angle position forming the letter T of each group. When both sets or groups of plates on the same side of the tunnel casing are swung into ballast functioning position the six plates together form the letter H. The plates 66 and 67 when in water ballast functioning position are in line with the center leg of the letter H formed by the triple plates mounted in part on the tunneled casing.

When not in use the bulkhead or swash plates are thus collapsed and stored against the tunnel casing wall, two of such groups on each side of the tunnel, while the two sets of collapsible bulkhead or swash plates rest against the bulkhead 58, as shown in full lines in the lower part of Fig. 12.

In order to prevent possible damage from cargo while loading and discharging, the four sets or groups of plates hinged to the tunnel casing are protected with an apron 86 extending across the top of the tunnel casing 50 and from a point forward of the hinges 69 to the bulkhead 56. The vertical angle iron 70 to which the hinges 69 are attached extends to the under side of the apron supporting same. The four angle irons 70 are tied together with gusset plates 87 fitted and welded to the top of the tunnel casing as well as to the angles on each side the casing. This affords complete support for the apron and at the same time reinforces the tunnel casing and eliminates undue strain to the casing at the point where the hinges 69 are engaged. The apron as illustrated projects beyond the sides of the tunnel casing 50 thereby fully protecting the collapsible plates from damage from cargo while loading.

Preferably swivel rollers are attached to the bottom of certain of the individual bulkhead or swash plates to facilitate the installation and dismantling of the same, and at the same time to avoid any undue strain on the hinges of the carrying plates. For example, a swivel roller or castor 88 is mounted near the outer edge of the plate 64 (and also plate 61), the roller rolling along the floor 10 of the hold. Likewise the plate 63 (and also plate 60) is provided at a point near the bilge boards 33 with a supporting roller 89. The plate 62 is provided with a roller 88′ near its outer edge where it is attached to the plate 65. If, as shown in the embodiment illustrated, the wood ceiling 45 covers only a part of the floor 10, roller paths are cut in the wood ceiling 45 so as to permit the rollers to travel on the tank top 10. If the protective ceiling covers the whole floor flat bars with the proper arcs may be secured on the top of the ceiling for the rollers. In the particular embodiment shown the bulkhead or swash plate 66 is not provided with a supporting roller but the plate 67 which is hinged thereto is provided with a roller 90 which rolls along the floor 10.

Figure 15:
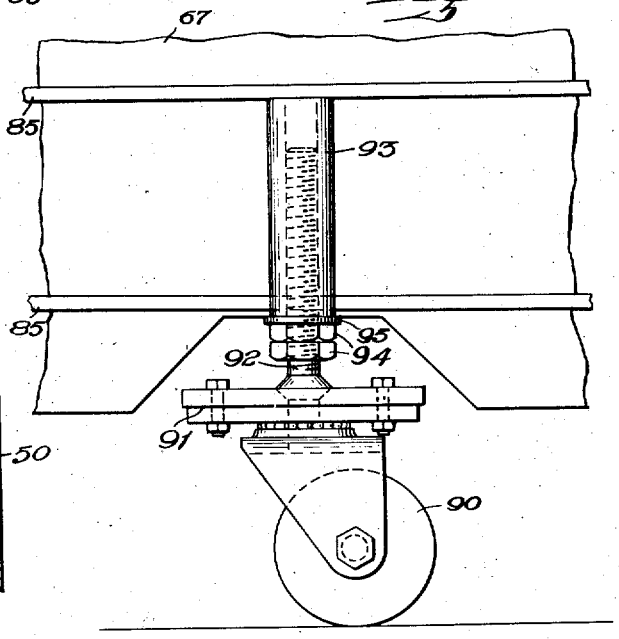

The rollers and roller mounts are all substantially the same and a description of one will suffice. The details of one such roller (90) and mounting are shown in Fig. 15. The plate 67 is here provided with spaced strengthening stiffener bars 85. The roller 90 is mounted for swiveling movements on the washer 91 having a screw-threaded stem 92 fitted into pipe guard 93. Lock nuts 94 and a washer 95 function to lock the roller in its adjusted vertical position for taking the strain off the hinges. The dot-dash lines on Fig. 12 show the paths followed by certain of the rollers upon collapse and distension of the ballast structure.

The water ballast may be introduced into and removed from the holds 2 and 4 in any convenient manner. It may be pumped into the hold 2 through a Siamese connection 100 which is installed on the weather deck and connected to a pipe 101 extending to the bottom of the hold. Ordinary fire hose 102 may be connected between the Siamese connection and the ship's fire line 103 when water ballast is to be filled in. Ballast may be discharged through the hold's regular bilge suction. The ballast for the hold 4 may be pumped thereinto through two connections 104 installed on the weather deck which may be connected to two pipes 105 extending down to the bottom of the hold, one on each side of the shaft alley 50. Two filling lines are used in this instance in order to prevent the vessel from taking any list while filling through one line. The fire line 103 is connected with the connections 104 through ordinary fire hose 106. The filling of the ballast through fire hoses visible on deck to the master and officers definitely insures against damage to cargo as the result of sabotage or by erroneously opening valves which might flood the hold from the sea. The ballast may be discharged through the hold's regular bilge suction. A fire pump 107 supplies water to the pipe 103, and at 108 is shown a conventional pump for the discharge of the ballast water.

In the case of a Liberty vessel it is estimated that 5 feet of water in No. 2 hold will amount to approximately 556 long tons, and that the total weight of the steel of the bulkhead or swash plate structures amounts to 27 long tons. In other words, 583 long tons of weight should be added to the vessel if 5 feet of water were pumped into the hold after the swash plates were installed. Similarly, assuming a Liberty vessel, it is estimated that 440 tons of ballast water would be carried in No. 4 hold if filled to the top of the tunnel casing with the installation of the bulkhead and swash plate structures. The main draft of the vessel would be increased roughly 24 inches which would be sufficient to place the vessel in a safe and navigable operating condition.

The embodiments of the invention herein set forth are particularly adaptable to the holds Nos. 2 and 4 of a Liberty type vessel but it is understood that the invention is easily adaptable to any other type of vessel. The interlocking stanchion arrangement and construction in the forward hold and the swinging collapsible plate arrangement in the after hold may be installed in any type of merchant vessel, the size and shape of the swash plates and other cooperating parts of the structure being governed by the dimensions and shape of the hold to which the invention is applied together with the amount of ballast to be carried. No skilled mechanics are required for either installing the structure or manipulating it after installation. The hold ballast structure can be erected and dismantled or collapsed without difficulty either by the vessel's crew or by stevedores, either at home or abroad, with a minimum loss of time, and water ballast is always available for use. In both embodiments the plates are of sufficiently small dimensions and low weight to enable their erection, storage and manipulation by the crew or stevedores, but the embodiment of the No. 4 hold has the advantage over that of the No. 2 hold of having the plates permanently attached to the ship structure and of enabling the use of larger and heavier plates by reason of the hinged mounting than is the case with the No. 2 hold structure.

I claim:

1. A ship cargo hold comprising a floor and side enclosing walls having a plurality of separate shallow individual compartments for water ballast, with said floor forming the bottoms of the compartments and the hold side enclosing walls forming side walls of the compartments adjacent thereto and the other side walls of the compartments being formed of individual swash plates assembled in line in rows extending fore and aft and athwart ship, fixed socket fittings carried by the side hold enclosing walls and L-shaped members having one leg disposed in a socket and the other leg extending out horizontally, the latter legs being provided with slots for the reception of the outer edge of the plates adjacent thereto, and stanchions at the corners of the compartments resting loosely upon said floor, and said stanchions having two or more rigid collars with 90° spaced slots accommodating the edges of four juxtaposed swash plates, the collars of a stanchion having their slots in vertical alignment.

2. A ship cargo hold comprising a floor and side enclosing walls having a plurality of separate individual compartments for water ballast, with said floor forming the bottoms of the compartments and the hold side enclosing walls forming side walls of the compartments adjacent thereto, and the other side walls of the compartments being formed of individual swash plates assembled in line in rows extending fore and aft and athwart ship, means detachably fastening the edges of the plates adjacent the side walls of the hold thereto, and stanchions at the corners of the compartments resting loosely upon said floor, and said stanchions having two or more rigid collars with 90° spaced slots accommodating the edges of four juxtaposed swash plates, the collars of a stanchion having their slots in vertical alignment.

3. A ship cargo hold comprising a floor and side enclosing walls having a plurality of separate individual compartments for water ballast, with said floor forming the bottoms of the compartments and the hold side enclosing walls forming side walls of the compartments adjacent thereto and the other side walls of the compartments being formed of individual swash plates assembled in line in rows extending fore and aft and athwart ship, and stanchions at the corners of the compartments resting loosely upon said floor and said stanchions having two or more rigid collars with 90° spaced slots accommodating the edges of four juxtaposed swash plates, the collars of a stanchion having their slots in vertical alignment.

4. In a ship cargo hold, a plurality of vertically disposed swash plates forming separate shallow individual water ballast compartments with the floor of the hold forming the bottoms thereof, said plates being firmly secured together by readily attachable and detachable means and upon detachment being storable in compact groups with plates disposed parallel to each other, thereby leaving the bottom of the hold free for paying cargo, said swash plates being of sufficiently small dimensions and low weight as to enable them to be erected and manipulated by the individual crew members of the ship.

5. In a ship cargo hold, a plurality of vertically disposed swash plates forming separate shallow individual water ballast compartments with the floor of the hold forming the bottoms thereof, said plates being firmly secured together by readily attachable and detachable means and upon detachment being storable in compact groups with plates disposed parallel to each other, thereby leaving the bottom of the hold free for paying cargo, said swash plates being of sufficiently small dimensions and low weight as to enable them to be erected and manipulated by the individual crew members of the ship, and pipe connections from the fire hose leading to the bottom of the hold and pipe connections from the bottom of the hold to the bilge pump.

6. A ship cargo hold comprising a floor and side enclosing walls having a plurality of separate individual compartments for water ballast, with said floor forming the bottoms of the compartments and the hold side enclosing walls forming side walls of the compartments adjacent thereto and the other side walls of the compartments being formed of individual swash plates assembled in line in rows extending fore and aft and athwart ship, said side walls including a pair of bulkheads athwart the ship and spaced from each other in the fore and aft direction, the side frames of the ship structure between said bulkheads and centrally disposed fore and aft extending bulkheads projecting inwardly of the hold from said athwart bulkheads, and stanchions at the corners of the compartments resting loosely upon said floor, and said stanchions having two or more rigid collars with 90° spaced slots accommodating the edges of four juxtaposed swash plates, the collars of a stanchion having their slots in vertical alignment.

7. A ship cargo hold comprising a floor and side enclosing walls having a plurality of separate individual compartments for water ballast, with said floor forming the bottoms of the compartments and the hold side enclosing walls forming side walls of the compartments adjacent thereto, and the other side walls of the compartments being formed of individual swash plates assembled in line in rows extending fore and aft and athwart ship, said side walls including a pair of bulkheads athwart the ship and spaced from each other in the fore and aft direction, the side frames of the ship structure between said bulkheads and centrally disposed fore and aft bulkheads projecting inwardly of the hold from said athwart bulkheads, and stanchions at the corners of the compartments resting loosely upon said floor, and said stanchions having two or more rigid collars with spaced slots accommodating the edges of four juxtaposed swash plates, the collars of a stanchion having their slots in vertical alignment, and screw jacks pivotally fastened to the inner ends of said fore and aft extending bulkheads with their free ends engaging the adjacent stanchions in line with the bulkheads.

8. A ship cargo hold comprising a floor and side enclosing walls having a plurality of separate individual compartments for water ballast, with said floor forming the bottoms of the compartments and the hold side enclosing walls forming side walls of certain of the compartments and the other side walls of the compartments being formed of individual swash plates assembled in line in rows extending fore and aft and athwart ship, said side walls including a pair of bulkheads athwart the ship and spaced from each other in the fore and aft direction, the side frames of the ship structure between said bulkheads and centrally disposed fore and aft extending bulkheads projecting inwardly of the hold from said first-named bulkheads, and stanchions at the corners of the compartments resting loosely upon said floor, said stanchions having two or more rigid collars with spaced slots accommodating the edges of four juxtaposed swash plates, the collars of a stanchion having their slots in vertical alignment, and screw jacks pivotally fastened to the inner ends of said second-named bulkheads with their free ends engaging the adjacent stanchions in line with the bulkheads and plate holding means on said bulkheads and said side frames having slots in alignment with the rows of swash plates for the reception of the edges of the plates.

9. A ship cargo hold comprising a floor and side enclosing walls having a plurality of separate individual compartments for water ballast, with said floor forming the bottoms of the compartments and the hold side enclosing walls forming side walls of the peripheral boundary compartments and the other side walls of the compartments being formed of individual swash plates assembled in line in rows extending fore and aft and athwart ship, said side walls including a pair of bulkheads athwart the ship and spaced from each other in the fore and aft direction, the side frames of the ship structure between said bulkheads and centrally disposed fore and aft extending bulkheads projecting inwardly of the hold from said first-named bulkheads, and stanchions at the corners of the compartments resting loosely upon said floor, and said stanchions having two or more rigid collars with 90° spaced slots accommodating the edges of four juxtaposed swash plates, the collars of a stanchion having their slots in vertical alignment, and screw jacks pivotally fastened to the inner ends of said second-named bulkheads with their free ends engaging the adjacent stanchions in line with said bulkheads and detachable holding means on said bulkheads and said side frames having slots in alignment with the rows of swash plates for the reception of the edges of the plates, the plates at the side ship frames having the corners thereof removed to clear the bilge boards of the ship, and fixed lugs attached to the floor in the vicinity of the bilge boards to engage and assist in holding the bottoms of the peripheral boundary plates in line.

10. A ship cargo hold comprising a floor and side enclosing walls having a plurality of separate individual compartments for water ballast with said floor forming the bottoms of the compartments and the hold side enclosing walls forming side walls of the peripheral boundary compartments and the other side walls of the compartments being formed of individual swash plates assembled in line in rows extending fore and aft and athwart ship, means at the hold side walls detachably fastening the outer edges of the peripheral boundary plates and means at the corners of the compartments resting loosely upon the floor and detachably holding in line the adjoining plates.

11. A ship cargo hold comprising a floor and side enclosing walls having a plurality of separate individual compartments for water ballast, with said floor forming the bottoms of the compartments and the hold side enclosing walls forming side walls of the peripheral boundary compartments and the other side walls of the compartments being formed of individual swash plates assembled in line in rows extending fore and aft and athwart ship, and stanchions at the corners of the compartments resting loosely upon said floor, and said stanchions having two or more rigid collars with 90° spaced slots accommodating the edges of four juxtaposed swash plates, the collars of a stanchion having their slots in vertical alignment, said collars on the stanchions being formed of the parts removed from the perforations in the swash plates.

12. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates hingedly carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast.

13. In a ship cargo hold having a floor and fore and aft spaced athwart bulkheads bridging the side frames of the ship, a central support extending fore and aft of said hold, a plurality of separate shallow individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast, said collapsible plates being arranged in three groups, one group hinged to the bulkhead and two of said groups being hinged to the said central support, said last-named groups each comprising three plates, two of the plates when extended being in line with each other and disposed athwart ship and the third plates of the two groups extending fore and aft and rigidly fastened together at their abutting ends and the first-named group comprising a pair of plates which when extended form a continuation of the third plates of the two groups.

14. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frames forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates carried by the central support and the bulkhead, said hinged plates being collapsible upon each other for storage against the central support and the bulkhead and being extensible to form the collapsible side walls of the compartments and means rigidly fastening said plates to each other and to the side frame when in the extended position to function for water ballast, said collapsibe plates being arranged in three groups, one group fastened to the bulkhead and two of said groups being fastened to the said central support, said last-named groups each comprising three plates, two of the plates when extended being in line with each other and disposed athwart ship and the third plates of the two groups extending fore and aft and rigidly fastened together at their abutting ends and the first-named group comprising a pair of plates which when extended form a continuation of the third plates of the two groups, and a protecting apron laterally projecting beyond said support and disposed above said collapsed groups of plates when folded against the central support.

15. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frames forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates carried by the central support and the bulkhead, said hinged plates being collapsible upon each other for storage against the central support and the bulkhead and being extensible to form the collapsible side walls of the compartments and means rigidly fastening said plates to each other and to the side frame when in the extended position to function for water ballast and a protecting apron fastened to said central support and disposed above the collapsed plates.

16. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frames forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates carried by the central support and the bulkhead, said hinged plates being collapsible upon each other for storage against the central support and the bulkhead and being extensible to form the collapsible side walls of the compartments and means rigidly fastening said plates to each other and to the side frame when in the extended position to function for water ballast, and roller supports engaging said floor and carried by said hinge plates.

17. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates hingedly carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast, the central support being a shaft tunnel casing and at least one group of plates being hinged to a side of said tunnel casing for swinging movements about a vertical axis.

18. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates hingedly carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast, the central support being a shaft tunnel casing and at least one group of plates being hinged to a side of said tunnel casing for swinging movements about a vertical axis, and at least one group of plates on one side of the tunnel being hinged to a bulkhead for swinging movements about a vertical axis.

19. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates hingedly carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast, the hinged collapsible plates comprising a group of at least three plates, one of said plates being hinged to the central support, another of said plates being hinged to the outer edge of said first-named plate to form a continuation thereof when extended and the third plate being hinged to one side of said first-named plate on an axis removed from the outer edge of the plate and adapted to assume a position at right angles to the first-named plate.

20. In a ship cargo hold having a floor and fore and aft spaced athwart bulkheads bridging the side frames of the ship, a central support extending fore and aft of said hold, a plurality of separate individual compartments for water ballast on each side of said central support with the floor forming the bottoms of the compartments, said support, bulkheads and side frame forming side walls of the compartments adjacent thereto, the other side walls of said compartments being formed of individual swash plates assembled in line in rows extending fore and aft and athwart ship, certain of said plates being hinged to the central support and one of said bulkheads and others of said plates being hinged to the plates hingedly carried by the central support and the bulkhead, said hinged plates being collapsible upon each other for storage against the central support and the bulkhead and being extensible to form collapsible side walls of the compartments and means rigidly fastening said plates to each other and to the side frame when in the extended position to function for water ballast, the hinged collapsible plates comprising a group of at least three plates, one of said plates being hinged to the central support, another of said plates being hinged to the outer edge of said first-named plate to form a continuation thereof when extended and the third plate being hinged to one side of said first-named plate on an axis removed from the outer edge of the plate and adapted to assume a position at right angles to the first-named plate, and a pair of plates one of which is hinged to a bulkhead and the other of said plates being hinged to the edge of the latter plate and means detachably fastening the outer edge of the plate to the first-mentioned plate of the first group at a point in the vicinity of the hinge connection of the third-named plate of the first group.

21. A ship construction comprising a cargo hold and a plurality of hinged collapsible swash plates forming compartments in the bottom thereof for water ballast and roller supports mounted on the bottom of said plates and engaging the floor of the hold for assisting in supporting the plates.

22. A ship construction comprising a cargo hold defined by vertical frame structures adjacent the cargo space and a plurality of hinged collapsible swash plates forming compartments in the bottom thereof for water ballast and roller supports mounted on the bottom of said plates and engaging the floor of the hold for assisting in supporting the plates, certain of said plates being hinged to the vertical frame structures and extensible out into the cargo space to form water ballast compartments and swingable about the hinges for storage against the frame structures when not being used for water ballast.

23. A ship construction comprising a cargo hold defined by vertical frame structures adjacent the cargo space and a plurality of hinged collapsible swash plates forming compartments in the bottom thereof for water ballast and roller supports mounted on the bottom of said plates and engaging the floor of the hold for assisting in supporting the plates, certain of said plates being hinged to the vertical frame structures and extensible out into the cargo space to form water ballast compartments and swingable about the hinges for storage against the frame structures when not being used for water ballast and certain of said plates being hinged to plates which are hinged to the vertical frame structures for storage against the frame structures in compact units.

24. In a ship cargo hold having a floor and fore and aft spaced athwart bulkheads bridging the side frames of the ship, a water ballast structure comprising a supporting frame disposed intermediate the bulkheads and the side frames of the ship, a plurality of separate individual compartments for water ballast on each side of the hold with the floor forming the bottoms of the compartments, said bulkheads and side frame forming side walls of the compartments adjacent thereto, other side walls of said compartments being formed of individual swash plates assembled in line in rows extending fore and aft and athwart ship, certain of said plates being hinged to the intermediate supporting frame and each carrying two plates hinged thereto to form units of three, said units being swingable about the hinges and storable upon each other in compact units of three plates and being extensible to form side walls of the compartments, and means detachably fastening said plates in the extended position to function for water ballast.

25. In a ship cargo hold, a water ballast compartment structure comprising a multiple number of assembly units of swash plate members, the members of an assembly unit being pivotally fastened together for relative collapsing movements to positions substantially parallel and close to each other for storage and for relative unfolding movements to water ballast compartment forming positions, said assembly units being movably mounted for ready movements to storage positions close to vertical frame structures of the hold and from storage positions to water ballast functioning positions, certain of said members being roller supported during movement of the assembly units from one position to the other, and when in water ballast compartment functioning positions certain of the plate members being disposed athwart ship and detachably fastened to vertical frame structures and certain of them being disposed fore and aft and detachably fastened to similarly disposed members of other units.

26. In a ship cargo hold, a water ballast compartment structure comprising a multiple number of assembly units of swash plate members forming with vertical frame structures water ballast compartments with the floor of the hold forming the bottoms thereof, the members of an assembly unit being fastened together for relative collapsing movements to positions substantially parallel to and close to each other for storage and for relative unfolding movements to water ballast compartment forming positions, said assembly units being movably mounted for ready movements to storage positions close to vertical frame structures of the hold and from storage positions to water ballast compartment functioning positions, and when in the latter positions certain of the plate members being disposed athwart ship and detachably fastened to the hold structure and certain others being disposed fore and aft and detachably fastened to similarly disposed members of other units.

27. In a ship cargo hold, a water ballast compartment structure comprising a multiple number of assembly units of swash plate members forming with vertical frame structures water ballast compartments with the floor of the hold forming the bottoms thereof, the members of an assembly unit being pivotally fastened to each other for relative pivoting movements, said units being collapsible and movably mounted for movements to storage positions close to a structural part of the hold and from the storage positions to water ballast compartment functioning positions, and when in the latter positions certain of the plate members of the units being detachably fastened at one end to the hold structure and other plate members of the units being detachably fastened at one end to each other, and means securely fastening said collapsed units in storage positions.

28. In a ship cargo hold, fore and aft extending means dividing the lower part of the hold into separate port and starboard sections, and a water ballast compartment structure in each section comprising a pair of assembly units of swash plate members, the members of an assembly unit being fastened to each other for relative collapsing and unfolding movements, said units being movably mounted for movements to storage positions close to a structural part of the hold and from the storage positions to water ballast compartment functioning positions, and when in the latter positions certain of the plate members of the units being detachably fastened at one end to the hold structure and other plates of the units being detachably fastened at one end to each other.

29. In a ship having a space for paying cargo, a plurality of groups of swash plates forming with vertical frame structures separate individual water ballast compartments with the floor of the cargo space forming the bottoms thereof, the plates being firmly secured in water ballast compartment functioning position by readily attachable and detachable means and upon detachment being movable therefrom and storable in compact groups with the plates of a group being disposed parallel to each other, thereby leaving the bottom of the cargo space free for paying cargo, and means facilitating movement from one position to the other including roller supports and mounts for certain of said plates.

PETER THOMPSON.